W. E. GREER.
VEHICLE WHEEL RIM.
APPLICATION FILED APR. 19, 1909.
959,732.
Patented May 31, 1910.
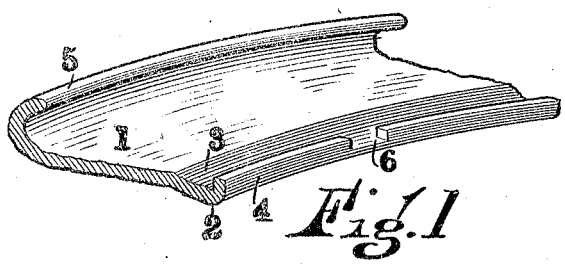
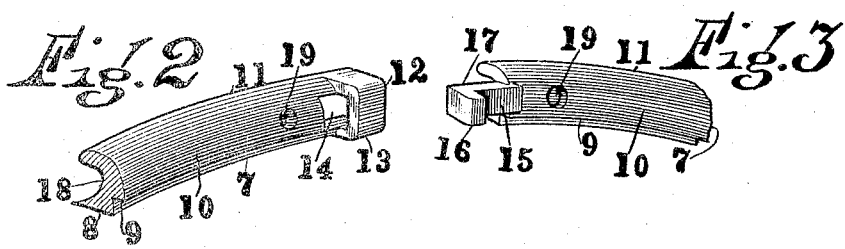
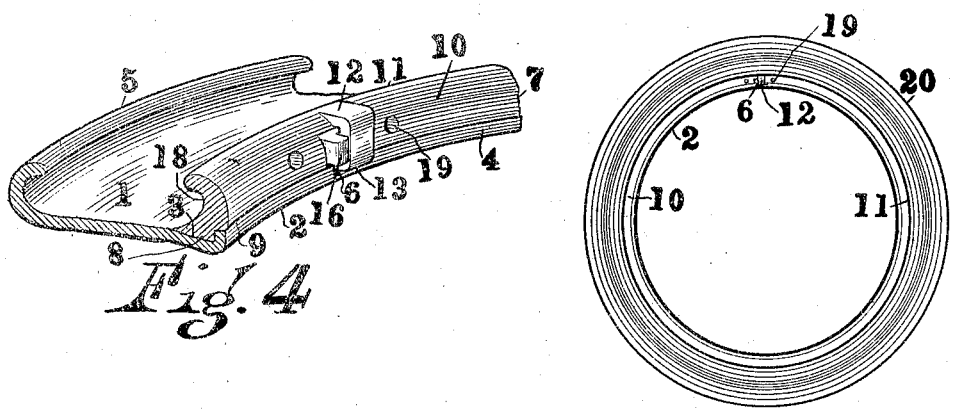
Witnesses:
INVENTOR-
William E. Greer,
By C. E. Humphrey
ATTORNEY.

UNITED STATES PATENT OFFICE.

WILLIAM E. GREER, OF KENMORE, OHIO, ASSIGNOR OF ONE-THIRD TO WILLIAM F. PFEIFFER, OF AKRON, OHIO, AND ONE-THIRD TO JACOB PFEIFFER, OF COLUMBUS, OHIO.

VEHICLE-WHEEL RIM.

959,732.  Specification of Letters Patent.  Patented May 31, 1910.

Application filed April 19, 1909. Serial No. 490,977.

*To all whom it may concern:*

Be it known, that I, WILLIAM E. GREER, a citizen of the United States, residing at Kenmore, in the county of Summit and State of Ohio, have invented new and useful Improvements in Vehicle-Wheel Rims, of which the following is a specification.

This invention relates to vehicle wheel rims adapted to be provided with pneumatic, solid or cushion tires of elastic material, more particularly pneumatic tires of the double-tube type having contractible, inextensible or semi-inextensible beads or edges and the object thereof is to so construct the wheel rim as to enable the tire to be quickly applied or removed when necessary.

The invention further aims to provide a wheel rim of the class referred to having a split annular holdfast device for the tire, hereinafter more specifically described, the ends of said holdfast device provided with interlocking means whereby when said device is contracted on a rim with the ends thereof interlocked, it will constitute effectual means for maintaining a tire securely in position on said rim.

A further and principal object of this invention is to provide the split ends of the annular holdfast device with new and improved means to permit their being interlocked and released from each other readily and of such construction that when the ends of said holdfast device are locked together they will not be readily unintentionally released.

A further object of this invention is to provide means for preventing circumferential movement of the tire-holding means with respect to the rim.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings, in which similar reference numerals indicate like parts in the different figures: Figure 1 is a cross sectional perspective view of a vehicle wheel rim and tire portion of a wheel, suitably shaped for use in connection with my improved holdfast means. Figs. 2 and 3 are perspective views of the ends of the split annular holdfast device for the tire provided with means for interlocking the same. Fig. 4 is a view similar to Fig. 1 with the holdfast device for the tire positioned thereon with its ends arranged in interlocking engagement; and, Fig. 5 is a view in side elevation of a vehicle wheel rim embodying this invention with a tire mounted thereon.

Referring to the drawings in detail, the reference numeral 1 denotes a flat rim having one side formed with an endless offset 2, the upper face 3 of which is inclined, provided with a lateral outwardly-projecting flange 4, the inclined face 3 and flange 4 forming a seat for a purpose to be hereinafter set forth. This offset 2 preferably extends inwardly with respect to the outer face of the rim. The other side of the rim is formed with an upwardly-extending endless flange 5 constituting retaining means for a tire when mounted on the outer face of the rim 1. The flange 4 is provided with a notch 6, for a purpose to be later described.

The means for holding the opposite side of the tire from that engaged by the flange 5 comprises a split annular ring 7 having an inclined base portion 8 adapted to be seated on the inclined portion 3 of the rim and provided with a circumferentially-extending rabbet 9 fashioned to receive the flange 4, so that the upper face of the rabbet will rest on the outer surface of the flange 4 and the outer periphery 10 of this member will be flush with the lateral face of the former. The inner face of the member 7 is provided with a hook-shaped portion 11 corresponding in contour to the conformation of the permanent flange 5. The split ring 7 is adapted to be sprung over the flange 4 and be mounted in the seat formed by the inclined face 3 and the flange 4. One of the ends of the split member 7 is provided with a keeper 12 consisting preferably of a laterally-projecting loop the upper surface of which is flush with the outer periphery of the member 7 and the lower face 13 thereof extends inwardly of the horizontal face of the rabbet 9, for a purpose to be later described. In the wall of the end of the member 7 which is inclosed by the keeper 12 is formed a slotted recess 14 extending longitudinally of the member a short distance beyond the inner end of the keeper 12, for a purpose to be stated. The opposite end of the member 7 is provided with an integral projecting lug 15 having a shouldered end 16, the inner face 17 of this lug being flush with the inner face 18 of the member. The lug 15 is of appropriate size to freely enter the slot 14 in the opposite end of the member 7 in order to permit the shouldered end thereof to engage the keeper 12. Near both ends of the member 7 are recesses 19 arranged to receive a suitable implement to bring the two separated ends into locking engagement when the member 7 is being seated in position.

In setting up a device embodying this invention, a tire, designated in the drawings by the reference numeral 20 provided with laterally-projecting beads is slid onto the rim sufficiently to cause the bead on one side to engage under the inturned flange 5, after which the split member 7 is expanded sufficiently to pass over the flange 4 and spring to place in the seat formed by the inclined portion 3 and the flange 4 with the outer portion 11 thereof in engaging relation with the lateral bead on its respective side of the tire.

Experience has demonstrated that the separated ends of the member 7 cannot readily be brought into interlocking engagement ordinarily without the use of a tool and it may be applied by engaging in the recesses 19, which brings the separated ends of the member 7 together, causing the lug 15 to enter the slot 14 sufficiently to permit the shouldered end 16 of the lug to engage the keeper 12, after which the lateral pressure of the tire either when inflated or deflated is sufficient to maintain interlocking engagement between these ends.

It will be noted that the lower portion 13 of the keeper 12 depends below the upper face of the rabbet 9 and when the member 7 is positioned on the rim the depending portion 13 of the keeper 12 will be positioned in the notch 6 of the flange 4 which serves to prevent circumferential movement of the member 7 with respect to the rim 1.

In removing a tire the forward end of the lug 15 bearing the shoulder 16 is pushed laterally against the tire sufficiently to release it and allow it to be sprung over the flange 4, after which the tire may be withdrawn laterally from the outer face of the rim.

What I claim and desire to secure by Letters Patent, is:—

In a vehicle wheel, a tire retaining means consisting of a split ring having one end thereof provided with a slot and a transversely-extending U-shaped keeper of less width than the length of the slot, said keeper extending over a portion of the slot, said ring having its other end formed with a laterally-extending shouldered lug adapted to engage one side of said keeper for connecting the split ends of the ring together, said keeper integral with the ring and said lug being rigid and integral with the ring, and said keeper extending transversely with respect to the ring and having its outer portion flush with the outer edge of the ring, said slot arranged approximately at the end of the ring in which the slot is formed and said lug positioned approximately centrally of that end of the ring with which it is formed integral.

In testimony whereof I have hereunto set my hand in presence of two subscribing witnesses.

WILLIAM E. GREER.

Witnesses:
C. E. HUMPHREY,
GLENARA FOX.